(No Model.)
T. E. STRICKLAND.
GLASS ORNAMENTATION FOR IMITATION OF FINE POLISHED STONE.
No. 327,348. Patented Sept. 29, 1885.
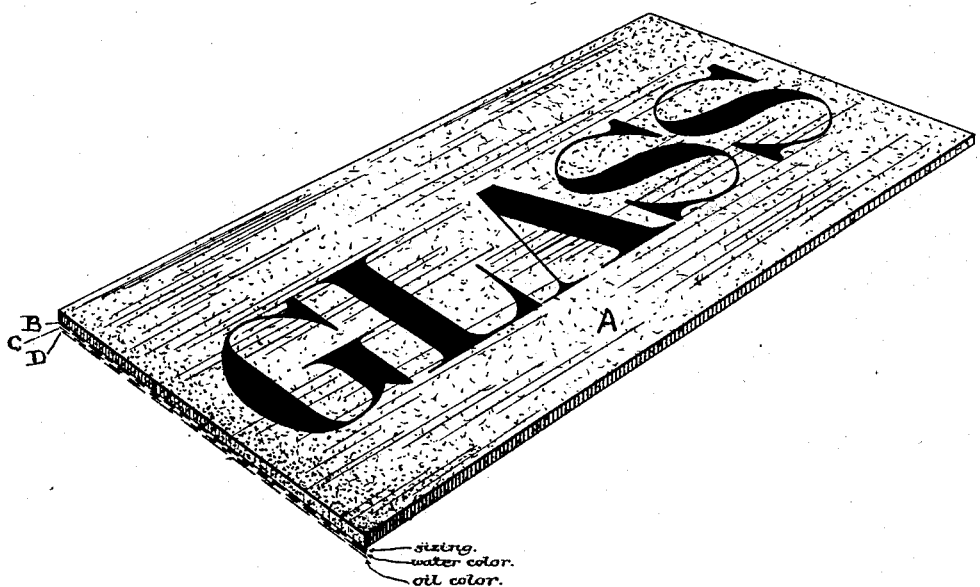
Attest:
John A. Ellis
A. B. Moore
Inventor:
Thomas E. Strickland
By David A. Burr
Atty.

UNITED STATES PATENT OFFICE.

THOMAS E. STRICKLAND, OF NEW YORK, N. Y.

GLASS ORNAMENTATION FOR IMITATION OF FINE POLISHED STONE.

SPECIFICATION forming part of Letters Patent No. 327,348, dated September 29, 1885.

Application filed March 14, 1885. (No specimens.)

*To all whom it may concern:*

Be it known that I, THOMAS E. STRICKLAND, of the city, county, and State of New York, have invented a new and useful Improvement in the Ornamentation of Glass in Imitation of Fine Polished Stones; and I do hereby declare that the following is a full and exact description thereof, reference being had to the accompanying drawing, and to the letters of reference marked thereon, making a part of this specification.

My invention relates to the production of artificial mosaics or imitation of colored stones in glass for various purposes, and has for its object to facilitate the production of highly-decorative mural effects, and of ornamental signs, &c., seemingly with polished stones or marbles of solid uniform colors.

It consists in applying transparent water-colors, preferably in spatter-work, to a prepared surface of glass, and overlaying and fixing it with a finishing coat of oil-color whose tint is adapted to harmonize with that of the transparent water-color, and to produce in combination therewith the desired tone, color, and appearance of the polished stone to be imitated.

The accompanying drawing illustrates my invention as applied to a sign.

In carrying out my invention I take a sheet of glass, A, and preferably prepare the surface thereof for the reception of water-color by sizing it with a solution, B, of gum-arabic or other of the well-known adhesive sizing solutions or compounds which will serve to receive and retain a water-color applied thereto without permitting it to "run" or spread upon its surface.

I then apply, preferably by the customary process known as "spatter," one or more transparent water-colors, C, of any desired tint or shade, this spatter-work in water-colors being made so fine and close in grain as to simulate in its appearance the grain of the stone to be imitated. When this is dry, I overlay the transparent water-color spatter-work with a coat of oil-color, D, whose tint will appropriately blend with that of the transparent or semi-transparent water-color, so that, showing partly through it, it will produce the effect, as seen through the glass, of a fine-grained polished stone of the color of the natural stone imitated thereby. By this means I readily obtain, at comparatively low cost, bits of glass in imitation of all manner of polished stones, with which to produce all manner of mosaics, or sheets of larger size for wainscoting and mural decorations, &c., and which may be substituted for polished-stone tiling.

My invention is also adapted to the production of ornamental signs, as illustrated in the accompanying drawing, having the appearance of being written on slabs of polished stone.

In some cases the water-color may be applied directly to the glass without sizing, so that it shall spread thereon more or less, and thereby imitate certain effects in stone which may not otherwise be so readily obtained.

I claim as my invention—

1. The method herein described of producing imitations of polished stones by applying to the surface of a sheet of glass a spatter-work of transparent water-color and overlaying the same with a coat of oil-paint.

2. An imitation of polished stone produced, as described, by coating a sheet of glass with a layer of water-color and an outer coating of oil-color, in manner substantially as set forth.

In testimony whereof I have signed my name to this specification in the presence of two subscribing witnesses.

THOMAS E. STRICKLAND.

Witnesses:
P. ELBERT NOSTRAND,
A. B. MOORE.